(12) United States Patent
Ward

(10) Patent No.: US 6,702,231 B2
(45) Date of Patent: Mar. 9, 2004

(54) DOOR SYSTEM FOR CREATING AND MAINTAINING A SECURED AREA

(76) Inventor: Gary Ward, 3611 Rosedale, Dallas, TX (US) 75205

( * ) Notice: Subject to any disclaimer, the term of this patent is extended or adjusted under 35 U.S.C. 154(b) by 0 days.

(21) Appl. No.: 10/267,391

(22) Filed: Oct. 9, 2002

(65) Prior Publication Data

US 2003/0066931 A1 Apr. 10, 2003

Related U.S. Application Data

(60) Provisional application No. 60/328,216, filed on Oct. 10, 2001.

(51) Int. Cl.[7] .............................................. B64D 11/00
(52) U.S. Cl. ................................ 244/118.5; 244/129.4; 244/129.5; 49/163
(58) Field of Search ........................... 244/118.5, 121, 244/129.5, 129.4; 49/33, 70, 163, 168, 169, 170, 192, 193

(56) References Cited

U.S. PATENT DOCUMENTS

| | | | | |
|---|---|---|---|---|
| 4,478,001 A | * | 10/1984 | Hogan et al. | .................. 49/37 |
| 5,535,550 A | * | 7/1996 | Yang | ............................ 49/163 |
| 6,474,599 B1 | * | 11/2002 | Stomski | ................... 244/118.5 |
| 2002/0092951 A1 | * | 7/2002 | Haviv | ...................... 244/118.5 |
| 2003/0006342 A1 | * | 1/2003 | Page, Jr. | .................. 244/118.5 |
| 2003/0052225 A1 | * | 3/2003 | Butzlaff | .................... 244/118.5 |
| 2003/0052227 A1 | * | 3/2003 | Pittman | .................... 244/118.5 |

* cited by examiner

*Primary Examiner*—Michael J. Carone
*Assistant Examiner*—Gabriel S. Sukman
(74) *Attorney, Agent, or Firm*—Randall C. Brown; Priscilla L. Ferguson; Haynes and Boone, LLP

(57) ABSTRACT

Several embodiments are disclosed for a door system to secure the cockpit of an aircraft. One embodiment includes a frame which is hingedly coupled to an interior wall of an aircraft, such that the frame can swing from a first configuration to a second configuration. In the first configuration, the cockpit door is accessible and is not in a secure area. In the second configuration, the cockpit door is not accessible allowing the cockpit door to be opened in a secure area.

15 Claims, 4 Drawing Sheets

DOOR SYSTEM FOR CREATING AND MAINTAINING A SECURED AREA

CROSS-REFERENCE TO RELATED APPLICATIONS

This application claims priority to and incorporates by reference U.S. application Ser. No. 60/328,216, entitled, "Door System for Creating and Maintaining a Secured Area," filed on Oct. 10, 2001.

STATEMENT REGARDING FEDERALLY SPONSORED RESEARCH OR DEVELOPMENT

Not applicable

REFERENCE TO A MICROFICHE APPENDIX

Not applicable.

BACKGROUND OF THE INVENTION

In aircraft, once the cockpit crew has entered the cockpit, the cockpit door is closed and locked behind them, thereby creating an initially secure cockpit area. In a perfect world, the closed and locked cockpit door would be sufficient to keep unauthorized persons out of the secure cockpit area.

In reality, however, the cockpit door will be opened when physiological needs arise, or when the cockpit crew requests food or beverage service. When the reinforced cockpit door is opened, security is breached, and the reinforced door becomes useless as a defensive security measure to prevent the airplane from being commandeered. When the cockpit door is open, anyone seated in the forward passenger cabin can easily rush and invade the cockpit. The invader can then close and lock the reinforced door behind him or her, thereby turning the door into an offensive, rather than defensive, security measure. Thus, although closing and locking the cockpit door after the cockpit crew has entered creates an initially secured area, this security is breached when the door is subsequently opened.

In order to maintain the initially secured area even when the cockpit door is opened, an extended secured area must be created. The present invention relates to a door system for creating and maintaining a secured area. More specifically, the present invention provides a system by which the security of the cockpit area is maintained by way of an extended secured area. More specifically, the present invention relates to a system that provides at least two door and frame structures for creating and maintaining a secure cockpit area within aircraft. The system of the present invention can be used even where the physical configuration of the aircraft had previously prevented the creation of an extended secured area.

BRIEF SUMMARY OF THE INVENTION

The present invention is directed to a system that provides at least two door and frame structures for creating and maintaining a secure cockpit area. According to a preferred embodiment of the present invention, the first door and frame structure includes the cockpit door and the frame of the cockpit door. According to this embodiment, at least one other door and frame structure is provided, preferably an existing lavatory door, which is extendable upon activation by a member of the cockpit crew, and which is herein referred to as the "secured area door and frame structure." When the secured area door and frame structure is extended, it substantially blocks access to areas forward of the extended secured area door and frame structure.

Locks are provided to lock the secured area door and frame structure into its extended position. When the secured area door and frame structure is extended and locked into position, an extended secured area is created aft of the cockpit door, and forward of the secured area door and frame structure. The secured area door and frame structure preferably includes a functional door, which when unlocked, can be opened by a person in the area of the cabin aft of the secured area door and frame structure. When a functional secured area door is provided, the secured area door itself must be locked by a person within the extended secured area. When the secured area door is locked, the extended secured area is accessible to persons within the cockpit area and to persons who were within the extended secured area prior to the locking of the secured area door, but not to persons who were in the cabin of the aircraft and outside the extended secured area when the secured area door and frame structure was extended and the secured area door locked.

The extended secured area extends aft from the cockpit door and sufficiently aft into the cabin of the aircraft to provide the cockpit crew with access to the lavatory. The extended secured area also makes it possible for the cockpit crew to receive food and beverages, without requiring that the cockpit door be opened into a generally accessible and less secured area such as the cabin of the aircraft.

Because the system of the present invention can provide an extended security area with as few as two door and frame structures, the system is particularly useful in aircraft configurations having a forward lavatory behind the cockpit, or other configurations where physical design constraints make it difficult or impossible to provide a lavatory door and frame structure, a secure cockpit door and frame structure, and an extended secured area door and frame structure. The present invention provides the following advantages:

1) A system that prevents the cockpit door from being open to the cabin of the aircraft during times of required access to and egress from the cockpit.
2) A system by which the cockpit crew can access the lavatory and the galley without breaching the security of the cockpit.
3) A system by which flight attendants can access the cockpit without breaching the security of the cockpit.
4) A system that maintains the security of the cockpit, with minimal effect on the passengers, cockpit crew, and cabin crew's access to the lavatory.
5) A system that maintains the security of the cockpit, and that can be installed in existing aircraft with little to no change in the basic layout of the lavatory/galley area.
6) A system that maintains the security of the cockpit, but that is simple in design, function, and use.

DETAILED DESCRIPTION OF THE INVENTION

Figure 1:
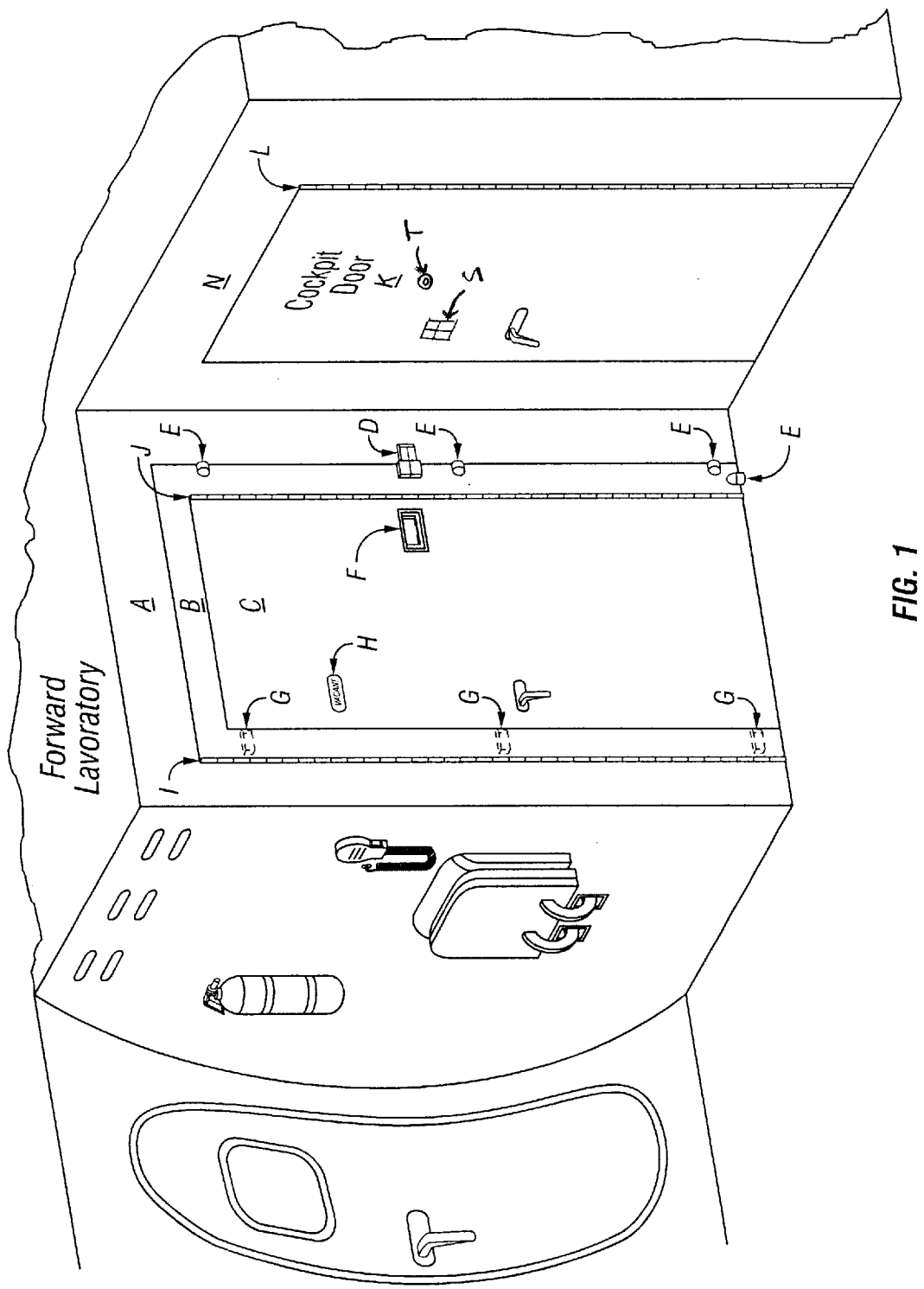
FIG. 1 is a side elevation of the door system for creating and maintaining a secured area according to the present invention.

Referring now to FIG. 1, FIG. 1 shows a cockpit door (K) mounted in a cockpit door frame (N). The cockpit door (K)

is mounted in the cockpit door frame (N) by means of hinges (L). Preferably, the hinges (L) of the cockpit door (K) are located on the starboard side of the door (K), so that the cockpit door (K) opens from left to right. Preferably, access to the cockpit area is controlled by a lock (not shown) that is controlled by a solenoid switch (not shown) that is accessible only to the cockpit crew. In addition, an electronic keypad (S) that is mounted in the cockpit door (K). Once cockpit door (K) is secured by persons inside the cockpit area, persons outside the cockpit area can gain access to the cockpit area by inputting a predetermined password into the electronic keypad (S). Preferably, a peep hole (T) is provided in the cockpit door, so that persons inside the cockpit area can see who is inputting a password into the electronic keypad (S). If the person desiring access to the cockpit area inputs the correct password into the electronic keypad (S), persons inside the cockpit can unlock the cockpit door (K) by activating the solenoid switch to release the lock.

Still referring to FIG. 1, a forward lavatory is also shown, having a lavatory door (C) mounted in a lavatory door frame (B), which in turn is mounted in a lavatory face wall (A). The lavatory door (C) as depicted in FIG. 1 is shown in a first normal operation position. Lavatory door (C) is mounted in the lavatory door frame (B) by means of hinges (J). Preferably, the hinges (J) of lavatory door (C) are located on the forward edge of the door (C) so that the door (C) opens from left to right. The lavatory door (C) has an indicator (H) for indicating whether the lavatory is vacant or occupied, and a recessed handle (F), which may be used to subsequently position the lavatory door (C) and lavatory door frame (B) into a second secured operation position. In a conventional manner, the indicator (H) is used to operate a lock for the lavatory door (C).

Still referring to FIG. 1 the lavatory door frame (B) is provided with a lock (D) that is controlled by a solenoid switch (not shown) that is accessible only to the cockpit crew. The lavatory door frame (B) is also provided with locks (G), which are located on the inside of the lavatory door frame (B), so that the locks (G) face the port side of the aircraft when the lavatory door (C) is in the first normal operation position. The lavatory door frame (B) is mounted in lavatory face wall (A) by means of hinges (I). Preferably, the hinges (I) of lavatory door frame (B) are on located on the aft edge of the door frame (B), so that when the lock (D) is released by the cockpit crew, the door frame (B) can be pivoted around hinges (I) from right to left and aft, and placed into a second secured operation position. The lavatory door frame (B) is also provided with lock receivers (E), which can receive or engage a locking mechanism when the door frame (B) is extended into the second secured operation position.

Figure 2:
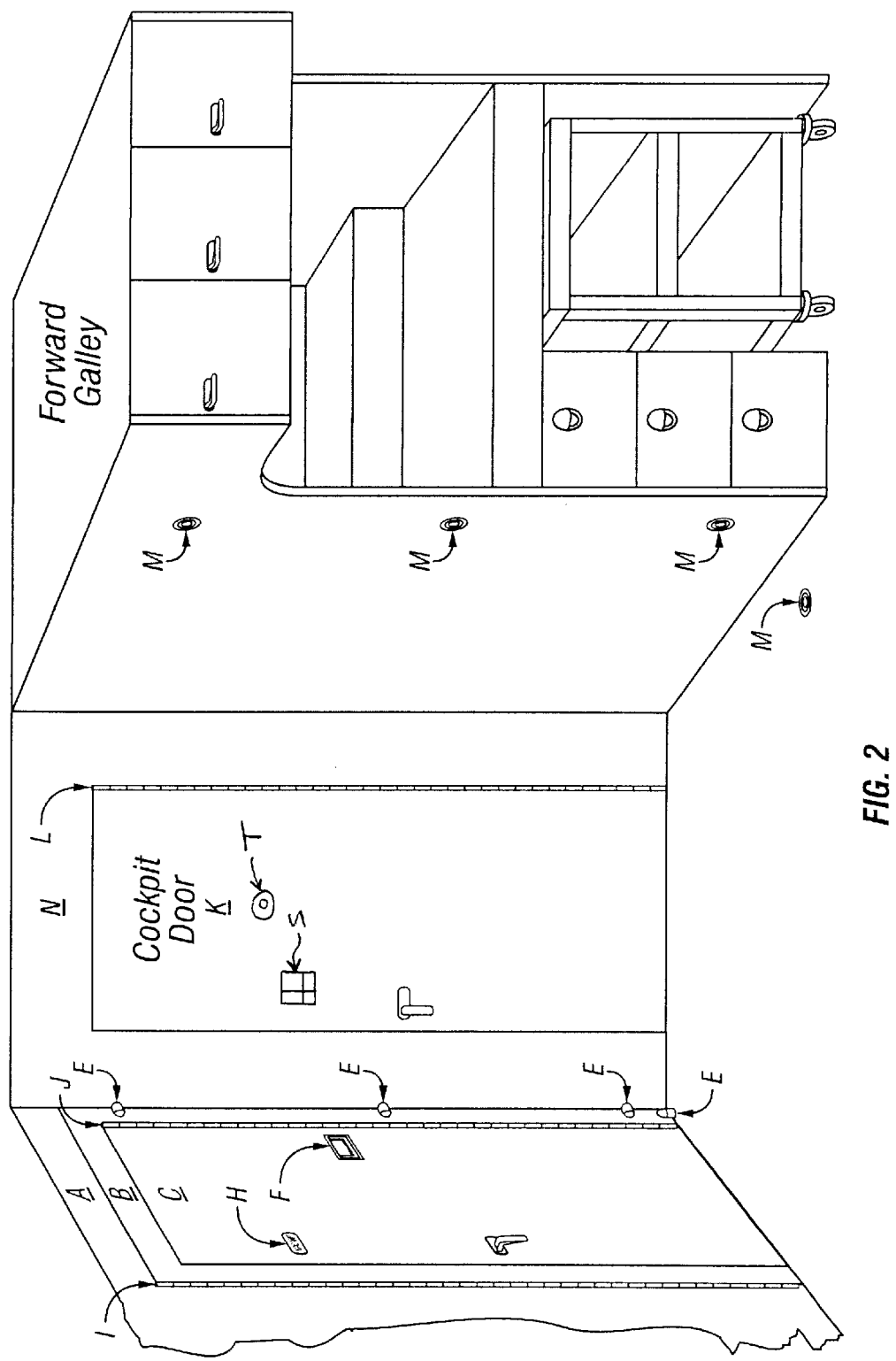
FIG. 2 is a perspective view of the door system for creating and maintaining a secured area according to the present invention.

Referring now to FIG. 2, a locking mechanism (M) is shown recessed into the port wall of a starboard side forward galley and into the floor of the aircraft. Locking mechanism (M) can be selected from locking mechanisms well-known to those of ordinary skill in the art, such as magnetic locks, which attract and hold magnets located within the secured door and frame structure, electronic locks, or locking pins, which are inserted into receivers (E) located within the frame structure (B). The locking mechanism (M) is exposed or otherwise activated only upon activation by the cockpit-controlled solenoid switch (not shown).

Figure 3:
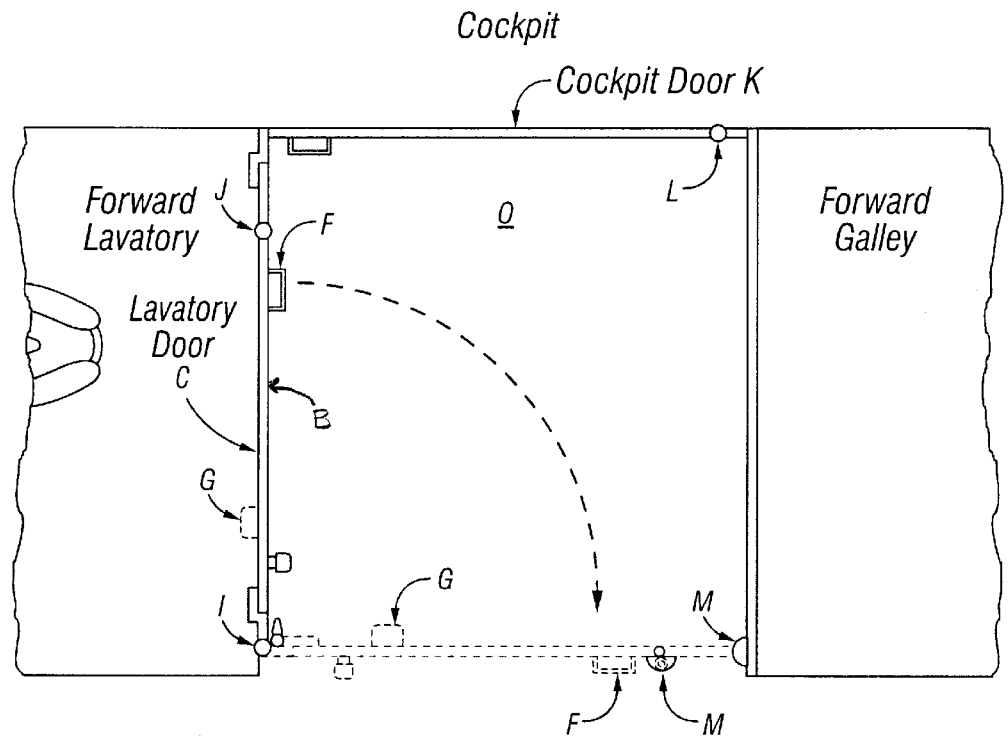
FIG. 3 is a schematic view of a first embodiment of the door system for creating and maintaining a secured area according to the present invention.
Figure 3:
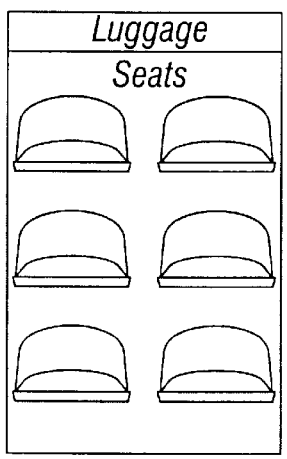
Figure 3:
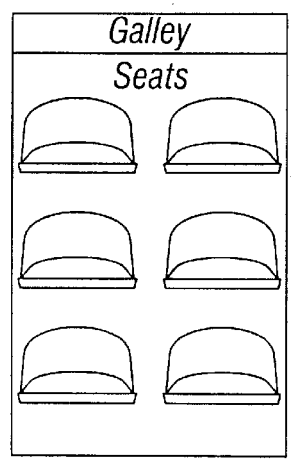

Referring now to FIG. 3, the dashed line in FIG. 3 represents lavatory door frame (B) after it has been extended into the second secured operation position, thereby creating extended secured area (O). As lavatory door (C) is located within lavatory door frame (B), it is carried with lavatory door frame (B) into the second secured operation position. In this position, locks (G) are accessible only from within the extended secured area (O), and as lavatory door frame (B) is in the second secured operation position, locks (G) are located on the forward side of lavatory door frame (B). Once locking mechanisms (M) have engaged the lock receivers (E) in the lavatory door frame (B), and the locks (G) on the lavatory door frame (B) have been locked, the entire structure comprised of lavatory door (C) and frame (B) is locked into the secured position, thereby creating secured area (O).

Figure 4:
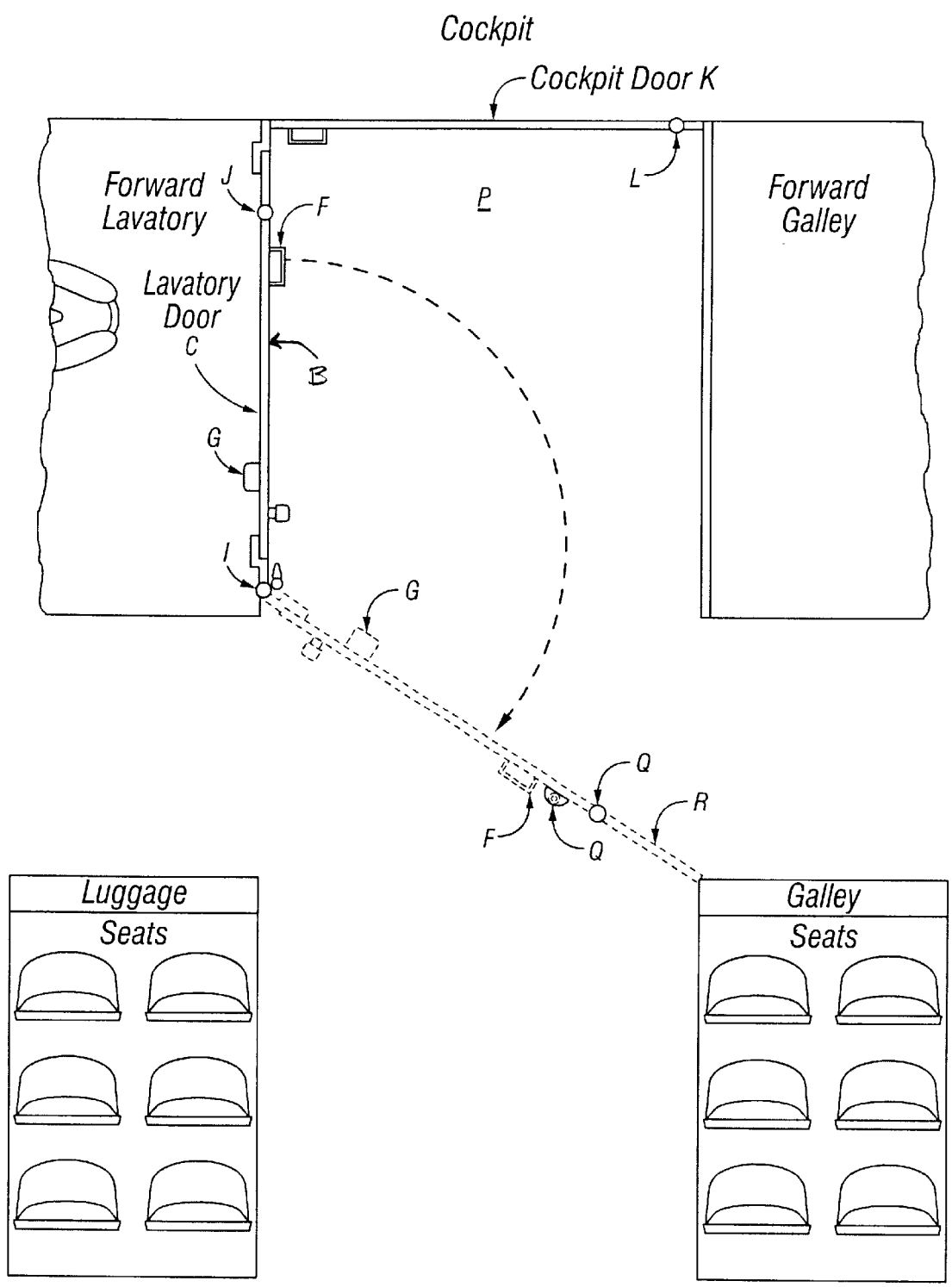
FIG. 4 is a schematic view of a second embodiment of the door system for creating and maintaining a secured area according to the present invention.

Referring now to FIG. 4, an alternative embodiment of the present invention is illustrated. According to this embodiment, a frame extension (R) is provided so that the forward galley is included within secured area (P). Locking mechanisms (Q) are provided, which emerge or are otherwise activated upon activation by the cockpit-controlled solenoid switch (not shown). Locking mechanisms (Q) secure the door and frame structure into the second secured operation position.

To create and maintain a secure cockpit area, a preferred embodiment of the system of the present invention provides two door and frame structures. In this preferred embodiment, the first door and frame structure includes the cockpit door and the frame of the cockpit door. According to this embodiment, the hinges of the cockpit door are placed on the starboard side of the door, such that the cockpit door opens from left to right and aft.

In this preferred embodiment, the cockpit area is initially secured when the cockpit door is closed and locked after the entry of the cockpit crew. The cockpit door can be locked by a variety of conventional means. A preferred means for locking the cockpit door comprises an electronic lock that is controlled by persons inside the cockpit. Accordingly, once the cockpit door is locked, persons outside the cockpit area can gain access to the cockpit area by inputting a predetermined password into an electronic keypad that is mounted on the cockpit door. If the person desiring access to the cockpit area inputs the correct password into the electronic keypad, persons inside the cockpit can unlock the cockpit door. In another preferred embodiment, a peep hole is provided in the cockpit door, so that persons inside the cockpit can see who is inputting a password into the electronic keypad before such person gains access to the cockpit.

Still according to this preferred embodiment, a second door and frame structure is provided, which is herein referred to as the "secured area door and frame structure." The secured area door and frame structure is extendable upon activation by a member of the cockpit crew. The cockpit crew activates the secured area door and frame structure by way of a solenoid switch. When the solenoid switch is activated, a solenoid lock is released, and the secured door and frame structure may be extended. A locking mechanism recessed within a starboard side wall of the aircraft is also activated when the solenoid switch is activated. A variety of locking mechanisms can be used, including magnetic locks, which attract and hold magnets located within the secured door and frame structure, electronic locks, or locking pins, which are inserted into receivers located within the secured door and frame structure.

When extended, the secured area door and frame structure is positioned so that it creates an extended secured area that extends aft of the cockpit door and sufficiently aft into the cabin of the aircraft so as to provide the cockpit crew with access to the lavatory.

In one embodiment, the secured area door and frame structure does not have a functional door, so that access to the secured area is not possible by persons located aft of the secured area door and frame structure. In another preferred embodiment, the secured area door and frame structure has a functional door, which has locks that can be locked only by persons located within the extended secured area. When the secured area door and frame structure is extended and locked into position, and when any functional secured area door is locked, an extended secured area is created forward of the secured area door and frame structure and aft of the cockpit door. When the functional secured area door is locked, the extended secured area is accessible to persons within the cockpit area and to persons who were within the extended secured area prior to the locking of the secured area door, but not to persons who were in the cabin of the aircraft and outside the extended secured area when the secured area door and frame structure was extended and the secured area door locked.

In another preferred embodiment of the invention, the secured area door and frame structure comprises the door and frame structure of a lavatory that is positioned behind the cockpit. In a first normal operation position, the lavatory door opens left to right and starboard, pivoting about its hinges. The lavatory is fully accessible to passengers in the cabin of the aircraft, and when so used, the door locks as it ordinarily would during such use. The lavatory door functions normally until it is necessary to move the door and frame structure into its second secured position to create the extended secured area.

According to this embodiment, when a member of the cockpit crew needs to access the lavatory, needs something to eat or drink, or otherwise needs the assistance of a person outside the initially secured cockpit area, the cockpit crew notifies a flight attendant that it is necessary to create the extended secured area.

Still according to this embodiment, the cockpit crew then activates a cockpit-controlled solenoid switch substantially similar to the cockpit-controlled solenoid switch of the previous embodiment, but adapted so that upon activation by the cockpit crew, the solenoid lock, which locks the lavatory door and frame structure in the first normal operation position is released. The release of the solenoid lock enables the lavatory door and frame structure to be pivoted around the hinges of the lavatory frame. The lavatory door and frame structure is then positioned by a flight attendant so that it contacts and engages a locking mechanism located within the forward starboard side galley. Optionally, a recessed handle on the forward side of the lavatory door is provided to assist the flight attendant in positioning the lavatory door and frame structure to contact the locking mechanism provided on the starboard side of the aircraft. Preferably, the locking mechanism includes solenoid locks, which had been recessed within the starboard forward galley, but which emerge upon activation by the cockpit-controlled solenoid switch. Contacts on the lavatory door engage the locks that have emerged from within the starboard forward galley. Alternatively, the locking mechanism can be pins, and the contacts can be receivers for the pins.

According to this embodiment, the secured area door and frame structure has a functional door, which is the former lavatory door. Locks are provided on the lavatory door, which are located on the forward side of the door when the door is in its extended position. The flight attendant opens the lavatory door, now in its extended position, and enters the as yet to be secured area. The flight attendant closes the lavatory door after entering, and engages the locks located on the forward side of the extended lavatory door, thereby creating the extended secured area. Preferably, the locks located on the forward side of the extended lavatory door include a single lever (three pin) mechanical lock.

In another preferred embodiment, the secured area door and frame structure is extended, again upon activation by the cockpit-controlled switch, so that the forward galley is included within the extended secured area. According to this embodiment, any extensions necessary to enable the secured area door and frame structure to enclose the forward galley can be provided by conventional means such as a pocket door telescoped within the lavatory frame structure or the forward galley, or a folded door recessed within the lavatory frame structure or the forward galley.

According to this embodiment, when the secured area door and frame structure is extended and locked into position, again by way of the magnetic, electronic, or pin locking mechanisms of the previous embodiments, there is no need to have a functional door as a part of the secured area door and frame structure. In this embodiment, the door and frame structure would not have a way of entry from areas aft of the door and frame structure. Alternatively, when the forward lavatory door and frame structure provides the secured area door and frame structure, the secured area door and frame structure has a functional door, which has locks that can be locked only by persons located within the extended secured area.

According to the embodiment that includes the forward galley within the extended secured area, the extended secured area is accessible to persons within the cockpit area and to persons who were within the extended secured area before the secured area door and frame structure was extended and locked into place, and before any functional doors in the secured area door and frame structure are locked.

In another preferred embodiment of the invention, the secured area door and frame structure is recessed into either the port or starboard side of the aircraft, and is pulled across the body of the aircraft to create an extended secured area. In this embodiment, the cockpit controlled solenoid switch is adapted so that the secured area door and frame structure is accessible only upon activation of the solenoid switch, or so that the secured area door and frame structure automatically extends only upon activation by the solenoid switch.

In all embodiments, the extended secured area remains secured until the secured area door and frame structure is returned to its unextended position. Also, in all embodiments, those of ordinary skill in the art will recognize that the lavatory may be provided with a privacy curtain that may be extended across the lavatory by the cockpit crew to provide privacy when using the lavatory. When it is necessary to exit and reposition the secured area door and frame structure to its unextended and normal operating configuration, the procedures for creating the extended secured area are simply reversed.

Those of ordinary skill in the art will recognize that the materials comprising the door and frame structures contemplated herein can be varied. In a preferred embodiment, reinforced materials or materials of superior strength are used. In existing aircraft, existing door and frame structures can be either replaced entirely, or can be reinforced, so as to minimize the cost associated with retrofit. Furthermore, those of ordinary skill in the art will recognize that a wide variety of adjustments can be made, as dictated by the physical configuration of the aircraft.

In addition, those of ordinary skill in the art will recognize that the various features described herein for creating and maintaining a secured area can be used separately or in combination, and that a wide variety of mechanisms can be used to move and lock the door and frame structures disclosed herein into secured positions.

In this regard, although illustrative embodiments of the invention have been described, a wide range of modification, change, and substitution is intended in the disclosure herein, and in some instances, some features of the present invention may be employed without a corresponding use of the other features.

What is claimed:

1. A door system for an aircraft, the system comprising:
   a cockpit door,
   a cockpit door frame hingedly coupled to the cockpit door, wherein the cockpit door frame is adapted to be coupled to a first interior wall of an aircraft,
   a lavatory door,
   a lavatory door frame hingedly coupled to the lavatory door, wherein the lavatory door frame is adapted to be coupled to a second interior wall of an aircraft and the second interior wall is substantially perpendicular to the first interior wall, the lavatory door frame further comprising:
      a first edge and a second edge,
      wherein the first edge is adapted to be hingedly coupled to the second interior wall such that the second edge can swing from a first coupling position to a second coupling position, and
      wherein in the first coupling position the lavatory door frame is adapted to be securely coupled to the second interior wall and in the second coupling position the lavatory door frame is adapted to be securely coupled to an interior structure of the aircraft such that a passageway to the cockpit is blocked.

2. A door system for an aircraft, the system comprising:
   a door, and
   a door frame disposed about the door wherein the door is hingedly coupled to the door frame, the door frame has a first edge and a second edge, the first edge is hingedly coupled to an interior wall of an aircraft such that the second edge can be moved from a first coupling configuration to a second coupling configuration, wherein the second edge is coupled to a second structure of the aircraft.

3. The door system of claim 2 wherein in the first coupling configuration, the second edge is coupled to the interior wall of an aircraft and in the second configuration, the second edge is coupled to the second structure of the aircraft such that a passageway between the wall and the second structure is blocked.

4. The door system of claim 2 wherein the door is hingedly coupled to the door frame at a forward edge of the door.

5. The door system of claim 2 further comprising a first locking mechanism coupled to the door frame, wherein controls for the first locking mechanism are accessible from a cockpit of the plane.

6. The door system of claim 5 further comprising at least one second locking mechanism disposed within the door frame.

7. The door system of claim 3 further comprising:
   a locking mechanism coupled to the second structure,
   at least one lock receiver coupled to the door frame for receiving the locking mechanism when the door frame is in the second configuration, such that the door frame can be secured to the second structure.

8. The door system of claim 3 wherein the second structure is a wall opposite the interior wall.

9. The door system of claim 3 wherein the second structure is a second interior wall positioned substantially perpendicular to the interior wall.

10. The door system of claim 2 further comprising:
    a cockpit door, and
    a cockpit door frame hingedly coupled to the cockpit door, wherein the cockpit door frame is disposed on a second interior wall.

11. The door system of claim 10 wherein the second interior wall is substantially perpendicular to the interior wall.

12. The door system of claim 10 wherein the cockpit door is hingedly coupled to the cockpit door frame on the starboard side of the door so that the door opens from left to right as viewed from a passenger cabin.

13. The door system of claim 10 further comprising a locking mechanism coupled to the cockpit door to prevent unauthorized entry to the cockpit door.

14. The door system of claim 13 further comprising an electronic keypad coupled to the locking mechanism for controlling the locking mechanism.

15. The door system of claim 10 further comprising a peephole disposed within the cockpit door.

* * * * *